(12) United States Patent
Lakaniemi

(10) Patent No.: US 7,573,907 B2
(45) Date of Patent: Aug. 11, 2009

(54) DISCONTINUOUS TRANSMISSION OF SPEECH SIGNALS

(75) Inventor: Ari Lakaniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 417 days.

(21) Appl. No.: 11/509,330

(22) Filed: Aug. 22, 2006

(65) Prior Publication Data
US 2008/0049785 A1 Feb. 28, 2008

(51) Int. Cl.
*H04J 3/16* (2006.01)
*H04J 3/06* (2006.01)

(52) U.S. Cl. ...................................... 370/468; 370/517
(58) Field of Classification Search ................ 370/468, 370/477, 516, 517, 526
See application file for complete search history.

(56) References Cited

U.S. PATENT DOCUMENTS

| | | | | |
|---|---|---|---|---|
| 4,578,789 A | * | 3/1986 | Middleton et al. | 370/260 |
| 5,819,218 A | * | 10/1998 | Hayata et al. | 704/233 |
| 5,878,120 A | * | 3/1999 | O'Mahony | 379/93.09 |
| 6,816,832 B2 | * | 11/2004 | Alanara et al. | 704/205 |
| 7,336,630 B2 | * | 2/2008 | Hamalainen et al. | 370/329 |
| 2002/0103643 A1 | * | 8/2002 | Rotola-Pukkila et al. | 704/233 |
| 2004/0062274 A1 | * | 4/2004 | Hakansson et al. | 370/468 |
| 2005/0250534 A1 | * | 11/2005 | Maurer | 455/556.1 |
| 2006/0056383 A1 | | 3/2006 | Black et al. | |
| 2007/0147327 A1 | * | 6/2007 | Jin et al. | 370/342 |

FOREIGN PATENT DOCUMENTS

EP 1 655 911 5/2006

WO 00/42749 7/2000

OTHER PUBLICATIONS

International Application No. PCT/IB2007/053224, Form PCT/ISA/220 (2 pages) dated Jan. 24, 2008 with Form PCT/ISA/210 (4 sheets) and Form PCT/ISA/237 (5 pages) Transmitting International Search Report and Written Opinion of the International Searching Authority (EPO).
"Digital cellular telecommunications system (Phase 2+); Universal Mobile Telecommunications System (UMTS); Speech codec speech processing functions; Adaptive Multi-Rate—Wideband (AMR-WB) speech codec; Source controlled rate operation (3GPP TS 26.193 version 6.1.0 Release 6)"; ETSI Standards, European Telecommunications Standards Institute, Sophia Antipolis, FR, vol. 3-SA4, No. V610, Jun. 2006, XP014034359; pp. 1-22.

(Continued)

*Primary Examiner*—Hong Cho
(74) *Attorney, Agent, or Firm*—Ware, Fressola, Van Der Sluys & Adolphson LLP

(57) ABSTRACT

Packets for a discontinuous transmission of a speech signal via a packet switched network may be provided in shorter transmission intervals during an active state and in longer transmission intervals during an inactive state. The active state may be selected whenever a speech signal comprises a speech burst, optionally with a hangover period after a respective speech burst. For enhancing the control of an adaptive jitter buffer at a receiver at the beginning of a respective transmission session, an active state is enforced in addition for a predetermined period at a beginning of a transmission session, irrespective of a presence of speech bursts. In case hangover periods are used, the length of the predetermined period exceeds the length of these hangover periods.

27 Claims, 6 Drawing Sheets

OTHER PUBLICATIONS

3GPP TS 26.171 V6.0.0, Dec. 2004; $3^{rd}$ Generation Partnership Project; Technical Specification Group Services and System Aspects; Speech codec speech processing functions; Adaptive Multi-Rate—Wideband (AMR-WB) speech codec; General description (Release 6).

3GPP TS 26.193 V6.1.0, Jun. 2006; $3^{rd}$ Generation Partnership Project; Technical Specification Group Services and System Aspects; Speech codec speech processing functions; Adaptive Multi-rate—Wideband (AMR-WB) speech codec; Source controlled rate operation (Release 6).

* cited by examiner

DISCONTINUOUS TRANSMISSION OF SPEECH SIGNALS

FIELD OF THE INVENTION

The invention relates to a discontinuous transmission of speech signals via a packet switched network.

BACKGROUND OF THE INVENTION

For a transmission of voice, speech frames may be encoded at a transmitter, transmitted via a network, and decoded again at a receiver for presentation to a user.

During periods when the transmitter has no active speech to transmit, the normal transmission of speech frames may be switched off. This is referred to as discontinuous transmission (DTX) mechanism. Discontinuous transmission saves transmission resources when there is no useful information to be transmitted. In a normal conversation, for instance, usually only one of the involved persons is talking at a time, implying that on an average, the signal in one direction contains active speech only during roughly 50% of the time. The transmitter may generate during these periods a set of comfort noise parameters describing the background noise that is present at the transmitter. These comfort noise parameters may be sent to the receiver. The transmission of comfort noise parameters usually takes place at a reduced bit-rate and/or at a reduced transmission interval compared to the speech frames. The receiver may then use the received comfort noise parameters to synthesize an artificial, noise-like signal having characteristics close to those of the background noise present at the transmitter.

In the Adaptive Multi-Rate (AMR) speech codec and the AMR Wideband (AMR-WB) speech codec, for example, a new speech frame is generated in 20 ms intervals during periods of active speech. Once the end of an active speech period is detected, the discontinuous transmission mechanism keeps the encoder in the active state for seven more frames to form a hangover period. This period is used at a receiving end to prepare a background noise estimate, which is to be used as a basis for the comfort noise generation during the non-speech period. After the hangover period, the transmission in switched to the comfort noise state, during which updated comfort noise parameters are transmitted in silence descriptor (SID) frames in 160 ms intervals. At the beginning of a new session, the transmitter is set to the active state. This implies that at least the first seven frames of a new session are encoded and transmitted as speech, even if the audio signal does not include speech.

Audio signals including speech frames and comfort noise parameters may be transmitted from a transmitter to a receiver for instance via a packet switched network, such as the Internet.

The nature of packet switched communications typically introduces variations to the transmission times of the packets, known as jitter, which is seen by the receiver as packets arriving at irregular intervals. In addition to packet loss conditions, network jitter is a major hurdle especially for conversational speech services that are provided by means of packet switched networks.

More specifically, an audio playback component of an audio receiver operating in real-time requires a constant input to maintain a good sound quality. Even short interruptions should be prevented. Thus, if some packets comprising audio frames arrive only after the audio frames are needed for decoding and further processing, those packets and the included audio frames are considered as lost. The audio decoder will perform error concealment to compensate for the audio signal carried in the lost frames. Obviously, extensive error concealment will reduce the sound quality as well, though.

Typically, a jitter buffer is therefore utilized to hide the irregular packet arrival times and to provide a continuous input to the decoder and a subsequent audio playback component. The jitter buffer stores to this end incoming audio frames for a predetermined amount of time. This time may be specified for instance upon reception of the first packet of a packet stream. A jitter buffer introduces, however, an additional delay component, since the received packets are stored before further processing. This increases the end-to-end delay. A jitter buffer can be characterized by the average buffering delay and the resulting proportion of delayed frames among all received frames.

A jitter buffer using a fixed delay is inevitably a compromise between a low end-to-end delay and a low number of delayed frames, and finding an optimal tradeoff is not an easy task. Although there can be special environments and applications where the amount of expected jitter can be estimated to remain within predetermined limits, in general the jitter can vary from zero to hundreds of milliseconds—even within the same session. Using a fixed delay that is set to a sufficiently large value to cover the jitter according to an expected worst case scenario would keep the number of delayed frames in control, but at the same time there is a risk of introducing an end-to-end delay that is too long to enable a natural conversation. Therefore, applying a fixed buffering is not the optimal choice in most audio transmission applications operating over a packet switched network.

An adaptive jitter buffer management can be used for dynamically controlling the balance between a sufficiently short delay and a sufficiently low number of delayed frames. In this approach, the incoming packet stream is monitored constantly, and the buffering delay is adjusted according to observed changes in the delay behavior of the incoming packet stream. In case the transmission delay seems to increase or the jitter is getting worse, the buffering delay is increased to meet the network conditions. In an opposite situation, the buffering delay can be reduced, and hence, the overall end-to-end delay is minimized.

One of the challenges in adaptive jitter buffer management is the reliable estimation of the transmission characteristics.

SUMMARY

The invention proceeds from the consideration that although a jitter buffer adaptation based on the reception statistics of most recent packets usually gives a reasonable estimate on the short-term network behavior, especially the initial estimate in the beginning of the session can be problematic, since there is only small amount of reception data to be used for estimating the optimal buffering delay.

Typically, in the beginning of the session there is no active speech to transmit, at least not in both directions. Consider for example a case where A is making a call to B. Since typically A does not say anything until he/she hears B answering the call, there is no transmission of active speech towards B until he/she has answered the call and A has replied to this. Thus, in practice this would imply that, when employing for example an AMR or AMR-WB codec, after the initial period of seven active speech frames at least in one direction, the signal may consists only of comfort noise parameter updates, possibly for several seconds.

Since the comfort noise parameter frames/packets are transmitted at a lower frequency than frames/packets carrying active speech, and since comfort noise parameter packets are also clearly smaller than the speech packets, they may not give a proper estimate on transmission conditions in the beginning of session. The smaller size of the packets may have a falsifying effect on the evaluation, since smaller comfort noise parameter packets may propagate faster than larger speech packets. If several speech frames are encapsulated in a packet, for example in a real time protocol (RTP) packet, the size difference between comfort noise parameter packets and speech packets—and thus the possible difference in propagation delay—is even larger. Further, if the RObust Header Compression (ROHC) is used to minimize the header overhead, the variations in compression performance due to a change in the transmission interval, when switching from speech to comfort noise parameter or vice versa, might cause variations in the resulting packet size. This may also have an impact on the propagation delay and/or on the jitter.

Thus, especially in the beginning of a session, there is a risk either of selecting an unnecessarily high buffering delay or of accepting an undesirably high frame loss rate until the reception estimate has stabilized and the jitter buffer adaptation is enabled to take corrective actions. A high buffering delay leads to reduced interactivity making a proper conversation difficult, while a high frame loss rate leads to bad speech quality and intelligibility problems. At the same time, the beginning of a session can be considered a semantically important part of a conversation, and therefore a good voice quality should be guaranteed to facilitate intelligibility and speaker recognition.

A method is proposed, which comprises providing packets for a discontinuous transmission of a speech signal via a packet switched network in shorter transmission intervals during an active state and in longer transmission intervals during an inactive state. The active state is selected whenever a speech signal comprises a speech burst, optionally with a hangover period after a respective speech burst. The method further comprises enforcing an active state in addition for a predetermined period at a beginning of a transmission session, irrespective of a presence of speech bursts. In case hangover periods are used, a length of the predetermined period exceeds a length of these hangover periods.

Moreover, an apparatus is proposed, which comprises a processing component configured to provide packets for a discontinuous transmission of a speech signal via a packet switched network in shorter transmission intervals during an active state and in longer transmission intervals during an inactive state, the active state being selected whenever a speech signal comprises a speech burst, optionally with a hangover period after a respective speech burst. The apparatus further comprises a control component configured to enforce an active state in addition for a predetermined period at a beginning of a transmission session, irrespective of a presence of speech bursts, a length of the predetermined period exceeding a length of said hangover periods in case hangover periods are used.

The processing component and the control component may be implemented in hardware and/or software. The apparatus could be for instance an audio transmitter, an audio transceiver, or an encoder, etc. It could further be realized for example in the form of a chip or in the form of a more comprehensive device, etc.

Moreover, an electronic device is proposed, which comprises the proposed apparatus and in addition a user interface, like a microphone.

Moreover, a system is proposed, which comprises the proposed apparatus and in addition a further apparatus. The further apparatus comprises a processing component configured to process packets received in a discontinuous transmission via a packet switched network using an adaptive jitter buffer.

Finally, a computer program product is proposed, in which a program code is stored in a computer readable medium. The program code realizes the proposed method when executed by a processor.

The computer program product could be for example a separate memory device, or a memory that is to be integrated in an electronic device.

The invention is to be understood to cover such a computer program code also independently from a computer program product and a computer readable medium.

It is thus proposed that at the beginning of a speech transmission session via a packet switched network, packets are always transmitted at short intervals, irrespective of the current speech activity in the speech signal. It is to be understood that the predetermined period during which packets are always transmitted at short intervals does not have to be fixed. The period just has to be known at the beginning of a respective speech transmission session.

While the invention proposes a change of the operation at a transmitting end of a speech transmission via a packet switched network, the effect becomes evident at the receiving end. The invention enables a receiver using an adaptive jitter buffer mechanism to perform a faster and more reliable jitter buffer adaptation during semantically important beginning of a voice call, and thus to produce a better voice quality.

The proposed mechanism increases the channel activity only for a short period of time at the beginning of a session.

The enforcement of an active transmission state can be caused at different processing stages, for example by influencing an encoding of the speech signal or by influencing the packetizing of conventionally encoded speech frames.

In one embodiment of the invention, the speech signal is divided into frames. An encoder may be provided for encoding these frames. Each of the frames may or may not comprise active speech. In general, the encoding may be different for frames comprising active speech and for frames not comprising active speech. During the active state, however, all frames of the speech signal may be caused to be encoded like frames comprising active speech, and all frames are packetized for transmission.

With this approach, the resulting packets provide transmission and reception characteristics that are equal to normal speech frames in respect of packet size and transmission rate. This results in the best possible estimate of the true initial reception conditions before the receiver receives the first "real" speech frames.

This approach could be implemented for example with a minor change in the discontinuous transmission behavior.

Enforcing the active state could be achieved, for example, by selecting a corresponding transmission type in the scope of a discontinuous transmission control, for which a dedicated discontinuous transmission controller may be provided. The transmission type selected by a discontinuous transmission controller can be used for indicating to a speech encoder which kind of encoding should be employed. It could be indicated for example that a current frame comprises active speech, that comfort noise parameters are required or that no data is required for a current frame. The discontinuous transmission control mechanism is thus suited to keep the encoder always in a state of encoding the speech signal as if it contained active speech for a desired period of time, simply by indicating that the current portion of the speech signal comprises active speech regardless of the actual content.

The predetermined period could be monitored in the scope of the discontinuous transmission control, for example by a dedicated DTX controller.

Alternatively, the predetermined period could be monitored externally, for example by a general purpose processor of a device. In this case, a discontinuous transmission controller could be provided with an external command to enforce the active state, or an encoder could be provided directly with such an external command. An employed DTX controller and/or an employed encoder could be provided to this end with an additional input, which can be used to force the encoding to use a type of encoding that is provided for active speech for a desired period of time, regardless of the actual content of the speech signal that is input to the encoder.

Instead of modifying the encoding of a speech signal, it is also possible to modify the packetizing for enforcing the active transmission state.

In this case, the speech signal could be encoded based on the content of the speech signal by an encoder. The encoding may result in frames that are indicated to contain usable data or not to contain usable data. Usable data can be for example active speech or comfort noise parameters, etc. Frames indicated not to contain usable data may then be packetized for transmission in packets just like frames indicated to contain usable data during the active state, while frames indicated not to contain usable data may be discarded outside of the active state. To this end, a processing component may be configured to packetize encoded frames received from an encoder for transmission in packets, while a control component is configured to cause the processing component to packetize frames indicated not to contain usable data during said enforced active state and to cause the processing component to discard frames indicated not to contain usable data outside of the enforced active state.

This approach could be implemented for instance by modifying a radio subsystem, which is employed for a channel encoding and packetizing of encoded frames and which uses such a processing component and such a control component. It could be implemented for example more specifically by modifying a transmission type monitoring component to operate as such a control component.

Adapting the packetization is a particularly simple solution when proceeding for example from current AMR and AMR-WB codecs. These codes provide that empty NO_DATA frames are generated by the encoder, when there is nothing to send. Instead of discarding these frames always, they could be packetized and transmitted for a desired period of time at the beginning of a respective session. While this solution would provide packets that might be smaller than the packets carrying speech frames, they could still be provided at the same transmission interval as used during active speech. If desired, packets that are based on frames indicated not to contain any usable data could moreover be enlarged with padding data. For instance, if RTP is employed, an RTP padding could be used to force the "empty" packets based on NO_DATA frames to have roughly the same size as normal speech packets.

The predetermined period during which an enforced active state is maintained should be sufficiently long to ensure that the receiver is able to make a reliable initial estimate of the reception characteristics. The predetermined period could lie for instance between 0.5 seconds and 5 seconds. A suitable value could be one second. Alternatively, the length of the period could also be set or signaled by the receiver, for instance by a decoder of the receiver. Further alternatively, it could be negotiated between the transmitting end and the receiving end, for example between an encoder of the transmitting end and a decoder of a receiving end.

It is to be understood that the predetermined period can be monitored by monitoring the time passing from the beginning of a new session, but equally by counting a corresponding number of processed frames, etc.

The invention can be employed for any speech codec using a discontinuous transmission at a transmitting side and an adaptive jitter buffer at a receiving side. Examples are the AMR codec or the AMR-WB codec used for VoIP.

It is to be understood that all presented exemplary embodiments may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
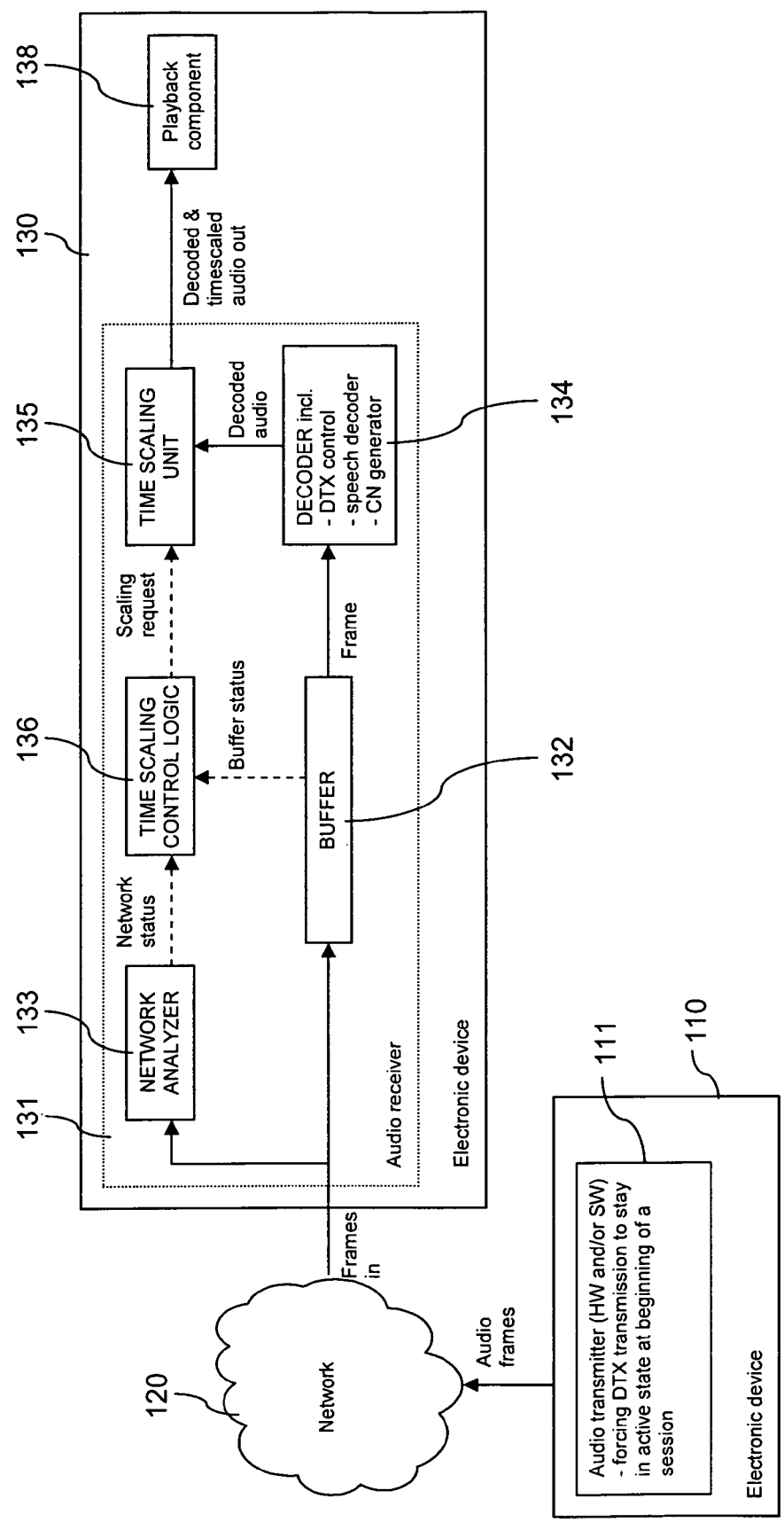
FIG. 1 is a schematic block diagram of a system according to an embodiment of the invention.

FIG. 1 is a schematic block diagram of an exemplary system, in which an active state of a DTX transmission can be enforced at a transmitting end for enabling an enhanced jitter estimation at a receiving end.

The system comprises an electronic device 110 with an audio transmitter 111, a packet switched communication network 120 and an electronic device 130 with an audio receiver 131. It is to be understood that the electronic device 110 may equally comprise a corresponding audio receiver 131 and that the electronic device 130 may equally comprise a corresponding audio receiver 111. The packet switched communication network 120 can be or comprise for example the Internet, and it can be accessed by both electronic devices 110, 130.

The audio transmitter 111 of electronic device 110 is designed in accordance with the invention. Details of some exemplary embodiments will be described further below with reference to FIGS. 2, 4, 6 and 8.

The input of the audio receiver 131 of electronic device 130 is connected within the audio receiver 131 on the one hand to a jitter buffer 132 and on the other hand to a network analyzer 133. The jitter buffer 132 is connected via a decoder 134 and a time scaling unit 135 to the output of the audio receiver 131. A control signal output of the network analyzer 133 is connected to a first control input of a time scaling control logic 136, while a control signal output of the jitter buffer 132 is connected to a second control input of the time scaling control logic 136. A control signal output of the time scaling control logic 136 is further connected to a control input of the time scaling unit 135.

The output of the audio receiver 131 may be connected to a playback component 138 of the electronic device 130, for example to loudspeakers.

When a speech signal is to be transmitted from electronic device 110 to electronic device 130, for instance in the scope of a VoIP session, the audio transmitter 111 encodes and packetizes audio frames and transmits the resulting packets via the packet switched communication network 120 to the audio receiver 131. The audio frames may be partly active speech frames and partly SID frames. Active speech frames are transmitted at 20 ms intervals, while SID frames are transmitted at 160 ms intervals. The SID frames comprise 35 bits of comfort noise parameters describing the background noise at the transmitting end while no active speech is present.

According to the invention, the DTX transmission is forced to an active state at the beginning of each session, irrespective of the presence of active speech in the speech signal. Exemplary details will be described further below with reference to FIGS. 3, 5 and 7.

At the receiving end, the jitter buffer 132 is used to store received audio frames waiting for decoding and playback. The jitter buffer 132 may have the capability to arrange received frames into the correct decoding order and to provide the arranged frames—or information about missing frames—in sequence to the decoder 134 upon request. In addition, the jitter buffer 132 provides information about its status to the time scaling control logic 136. The network analyzer 133 computes a set of parameters describing the current reception characteristics based on frame reception statistics and the timing of received frames and provides the set of parameters to the time scaling control logic 136. Based on the received information, the time scaling control logic 136 determines the need for a changing buffering delay and gives corresponding time scaling commands to the time scaling unit 135. The used average buffering delay does not have to be an integer multiple of the input frame length. The optimal average buffering delay is the one that minimizes the buffering time without any frames arriving late.

The decoder 134 retrieves an audio frame from the buffer 132 whenever new data is requested by the playback component 138. It decodes the retrieved audio frame and forwards the decoded audio frame to the time scaling unit 135. The time scaling unit 135 performs a scaling commanded by the time scaling control logic 136, that is, it may lengthen or shorten the received decoded frames. The decoded and possibly time scaled frames are provided to the playback component 138 for presentation to a user.

The coding and decoding of speech in the system of FIG. 1 may be based on the AMR codec or the AMR-WB codec.

Electronic device 110 can be considered to represent an exemplary embodiment of an electronic device according to the invention. Audio transmitter 111 or a component thereof can be considered to represent an exemplary embodiment of an apparatus of the invention.

Figure 2:
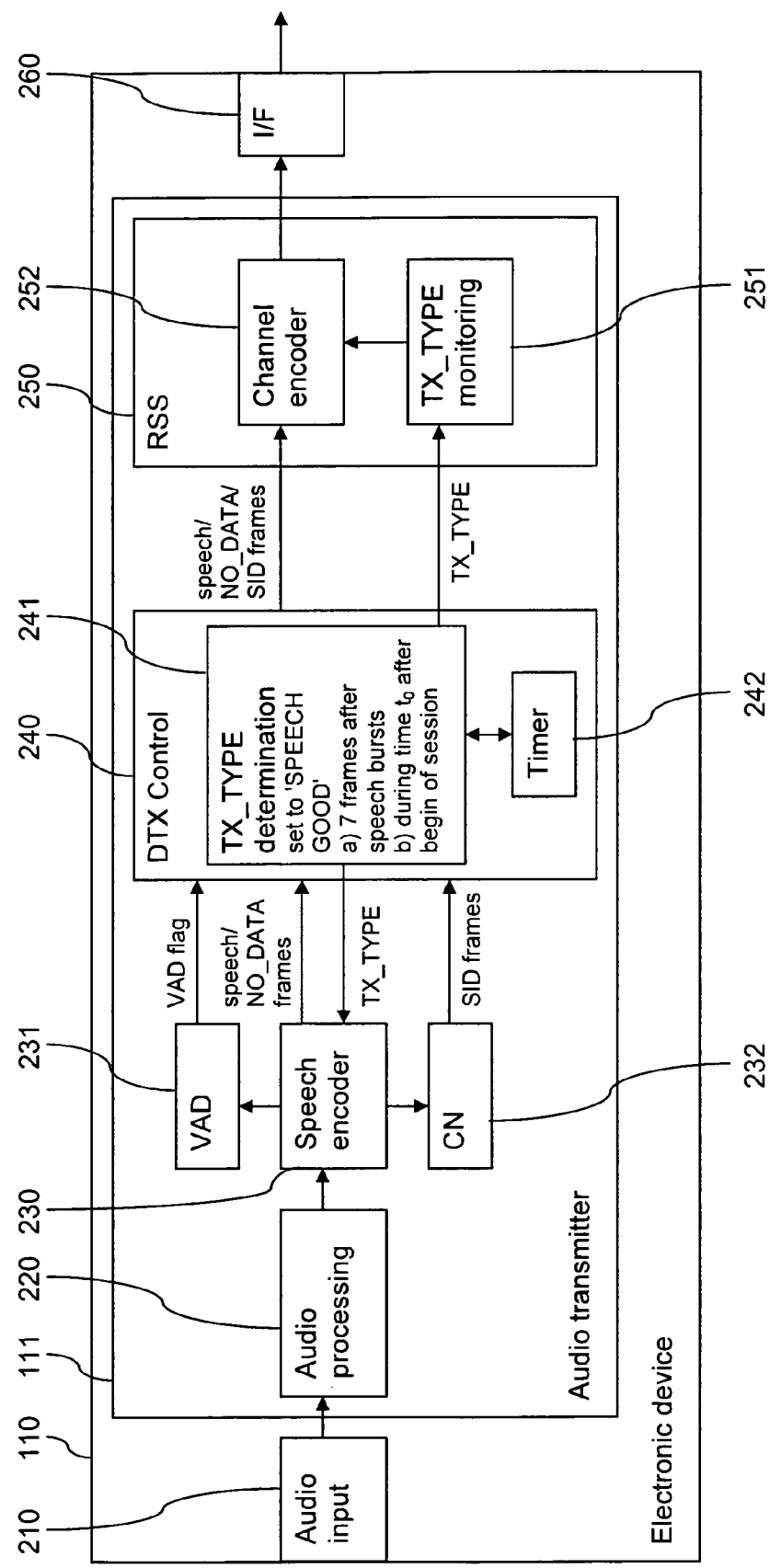
FIG. 2 illustrates details of a first exemplary device for the transmitting end in the system of FIG. 1.

FIG. 2 is a block diagram presenting details of a first exemplary implementation of the invention in electronic device 110.

In this electronic device 110, an audio input 210 is linked via the audio transmitter 111 to an interface (I/F) 260. The audio input 210 can be for instance a microphone. The interface 260 provides access to the packet switched communication network 120.

Within the audio transmitter 111, the audio input 210 is linked to a pre-processing component 220, which may include for instance an analog-to-digital converter. The pre-processing component 220 is further linked to a speech encoder 230. The speech encoder 230 is linked to a voice activity detector (VAD) 231, to a comfort noise (CN) parameter generator 232 and to a DTX controller 240. Voice activity detector 231 and comfort noise parameter generator 232 are equally linked to the DTX controller 240. The DTX controller 240 comprises a transmission type (TX_TYPE) determination portion 241 and a timer 242. The TX_TYPE determination portion 241 is configured to apply a special operation at the beginning of a respective VoIP session, and it is connected to this end to the timer 242. The DTX controller 240 is further linked to a radio subsystem (RSS) 250. The RSS 250 comprises a TX_TYPE monitoring portion 251 and a channel encoder 252. The RSS may finally be linked to the interface 260.

Components 230, 231, 232, 240, 241 and 242 could be considered to constitute an encoder.

Figure 3:
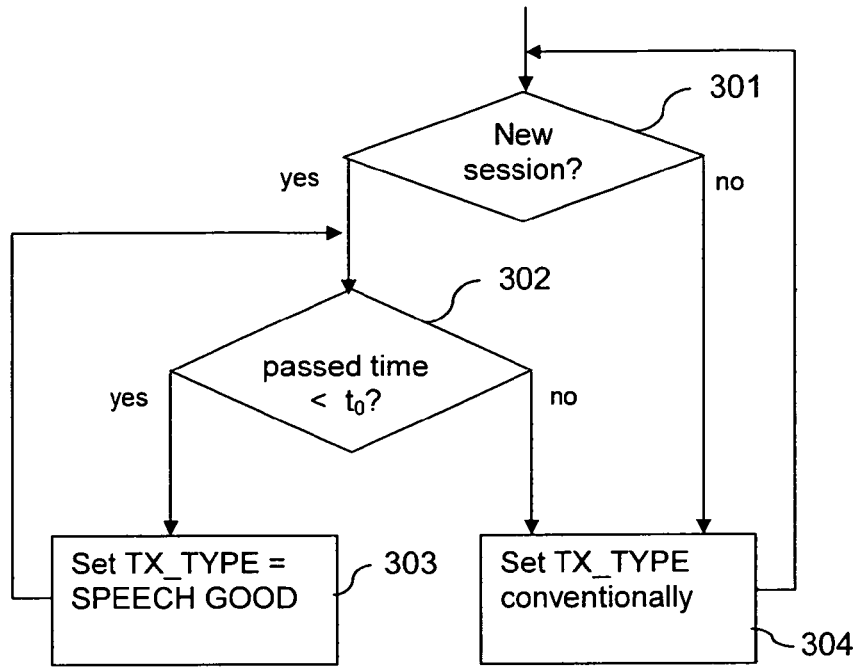
FIG. 3 is a flow chart illustrating an operation in the device of FIG. 2.

An operation in the electronic device 110 of FIG. 2 will now be described with reference to FIG. 3. FIG. 3 is a flow chart illustrating the operation in the TX_TYPE monitoring portion 251 of the DTX controller 250.

First, a general operation will be described, which may be implemented in a conventional manner.

When a connection of electronic device 110 to electronic device 130 has been established for a new VoIP session, the audio input 210 captures speech input by a user and provides the analog speech signal to the pre-processing component 220. The pre-processing component 220 converts the analog speech signal into a digital speech signal and applies any other desired processing operations. The digital speech signal is then provided as a sequence of audio frames to the speech encoder 230.

The speech encoder 230 forwards the audio frames to the voice activity detector 231, which detects whether the current audio frame comprises active speech. If this is the case, the voice activity detector 231 sets a VAD flag to '1', otherwise it sets the VAD flag to '0'.

The VAD flag is read by the DTX controller 240. The TX_TYPE determination portion 241 of the DTX controller sets the transmission type to TX_TYPE=SPEECH GOOD, whenever the VAD flag is set to '1'. In case a VAD flag is set to '0', the TX_TYPE determination portion 241 sets transmission type to TX_TYPE=SID_FIRST or TX_TYPE=SID_UPDATE whenever an SID frame with comfort noise parameters is to be transmitted. In between, it sets the transmission type to TX_TYPE=NO_DATA. For a hangover period covering the first seven audio frames after a reset, after enabling the DTX operation or after a transition of the VAD flag from '0' to '1', the transmission type is set in any case to TX_TYPE=SPEECH GOOD.

The DTX controller 240 provides the transmission type to the speech encoder 230. When receiving the indication TX_TYPE=SPEECH GOOD, the speech encoder 230 encodes the received audio frame as speech and provides the resulting encoded speech frame to the DTX controller 240. When receiving the indication TX_TYPE=NO_DATA, the speech encoder 230 generates a frame without any useful information and provides it to the DTX controller 240. When receiving the indication TX_TYPE=SID_FIRST or SID_UPDATE, the speech encoder 230 causes the CN parameter generator 232 to generates an SID frame including CN parameters and to provide this SID frame to the DTX controller 240.

The DTX controller 240 then provides the received encoded speech frame, the received NO_DATA frame or the received SID frame with a corresponding indication of the transmission type to the RSS 250.

In the RSS 250, the TX_TYPE monitoring portion 251 detects the type of the received frames. It causes the channel encoder 252 to encode and packetize all frames of the types TX_TYPE=SPEECH GOOD, SID_FIRST and SID_UPDATE. It causes the channel encoder 252 to discard all frames of the type TX_TYPE=NO_DATA.

Details of such a general operation can be taken for example from the 3rd Generation Partnership Project (3GPP) specification TS 26.193 V6.1.0 (2006-06): "Speech codec speech processing functions; Adaptive Multi-Rate-Wideband (AMR-WB) speech codec; Source controlled rate operation" (Release 6) and specifications referenced therein.

According to an embodiment of the invention, the TX_TYPE determination portion 241 monitors in addition whether a transmission belongs to a new VoIP session (step 301).

In case a new session is detected, the TX_TYPE determination portion 241 activates the timer 242, which counts down for example a time of $t_0=1$ second. The TX_TYPE determination portion 241 monitors whether the timer has run out (step 302).

As long as this is not the case, the TX_TYPE determination portion 241 sets the transmission type to TX_TYPE=SPEECH GOOD irrespective of the value of the VAD flag (step 303).

As a result, the speech encoder 230 encodes all received audio frames as speech frames, and these speech frames are provided via the DTX controller 240 to the RSS 250 with an indication TX_TYPE=SPEECH GOOD. The transmission type is detected by the TX_TYPE monitoring portion 251, which causes the channel encoder 252 to encode and packetize all received frames for transmission.

Thus, during the first second of the VoIP session, packets are transmitted in any case with an interval of 20 ms. This means that at least 50 packets are transmitted with an interval of 20 ms instead of only 7 employed during a hangover time. This enables the network analyzer 133 to compute the set of parameters describing the current reception characteristics at the beginning of a session in a more reliable way, as more information is available for the evaluated frame reception statistics.

Once the timer 242 has run out, the transmission type is selected based on the current value of the VAD flag as described above for the general operation, using only the short hangover time of 7 frames (steps 303, 304). This general operation is continued until the session is terminated and a new session is established (steps 301, 304).

It is to be understood that the TX_TYPE determination portion 241 could also be associated to a counter instead of to a timer 242. In this case, the TX_TYPE determination portion 241 could determined in step 302 whether a predetermined number of frames have been received from the speech encoder 230, after the beginning of a new session has been detected. Step 303 is then selected as long as less than the predetermined number of frames have been received, while step 304 is selected once the predetermined number of frames have been received.

Figure 4:
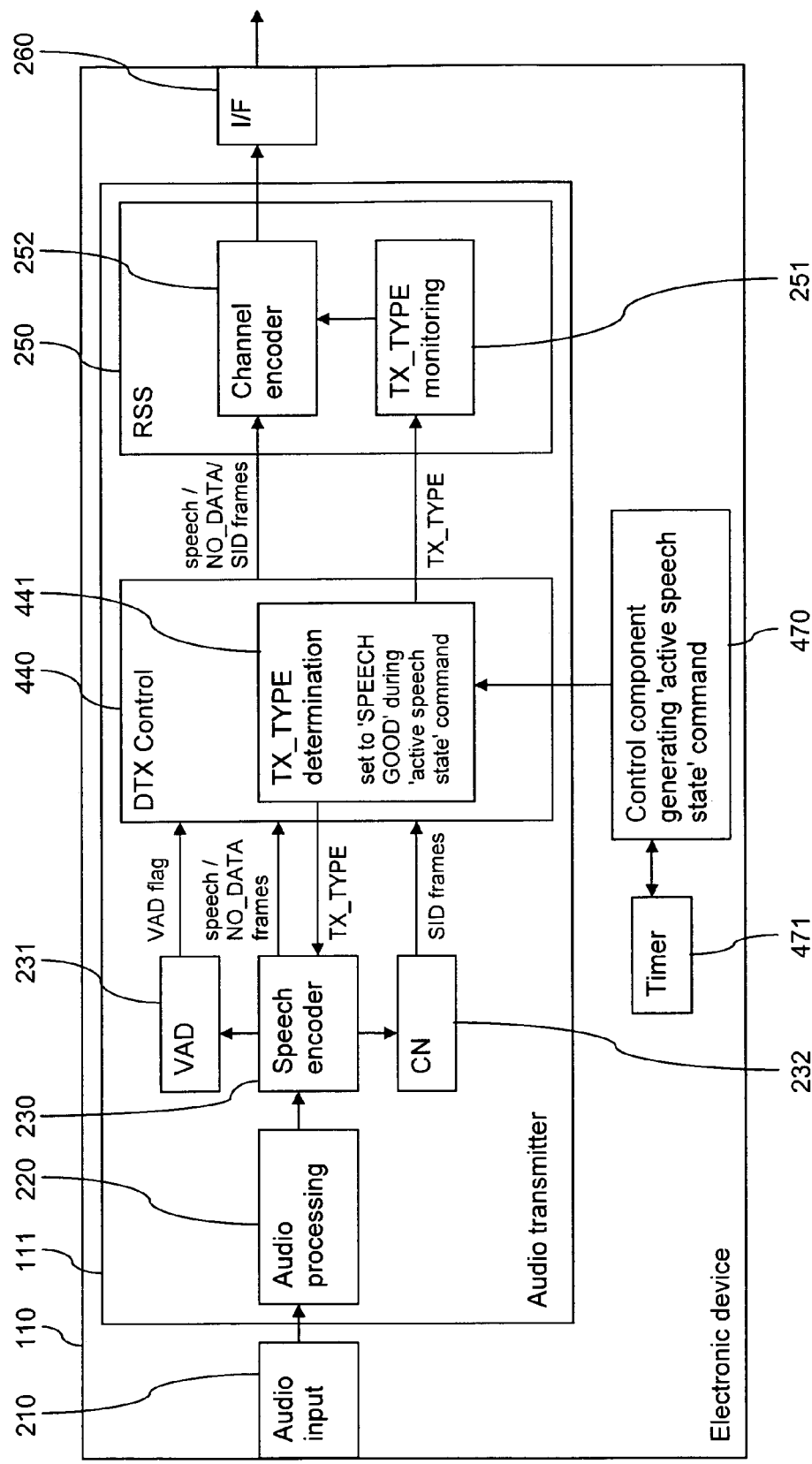
FIG. 4 illustrates details of a second exemplary device for the transmitting end in the system of FIG. 1.

FIG. 4 is a block diagram presenting details of a second exemplary implementation of the invention in electronic device 110.

The presented structure is largely the same as in FIG. 2. Corresponding components have been provided with the same reference signs as in FIG. 2 and these components will not be described again.

In this case, however, the DTX controller 440 comprises a TX_TYPE determination portion 441, which is configured to determine a transmission type partly based on an external command. Timer 242 is not provided. The external command is provided by a control component 470 of the electronic device 110, which is associated to a timer 471. The control component 470 could be for instance a processor executing a corresponding computer program code.

Figure 5:
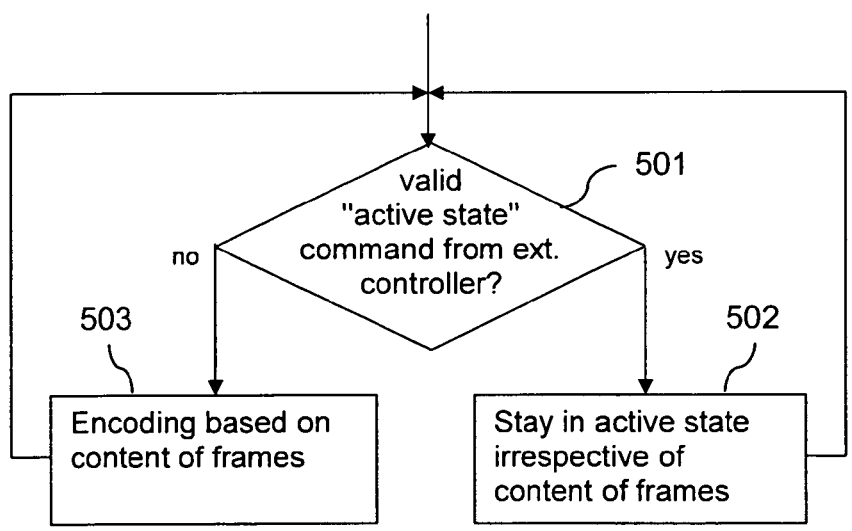
FIG. 5 is a flow chart illustrating an operation in the device of FIG. 4.

An operation in the electronic device 110 of FIG. 4 will now be described with reference to FIG. 5. FIG. 5 is a flow chart illustrating the operation in the DTX controller 440 and the speech encoder 230.

The general operation is again the same as described above for the electronic device of FIG. 2.

In this case, however, the control component 470 is informed when a new VoIP session has been established. If the control component 470 is a processor executing a corresponding computer program code, the same computer program code could also be responsible for setting up a connection to other electronic devices via the network 120 so that the information on the establishment of a new VoIP session is readily available.

When being informed about a new VoIP session, the control component 470 sends an 'active state' command to the TX_TYPE determination component 441 of the DTX controller 440. In addition, it activates the timer 471 to count down a predetermined period of time $t_0$, for example one second. Once the predetermined period has passed, the control component 470 sends an 'adaptive state' command to the TX_TYPE determination component 441 of the DTX controller 440.

The TX_TYPE determination component 441 monitors whether there is a valid 'active state' command from the control component 470 (step 501). That is, the TX_TYPE determination component 441 monitors whether an 'active state' command has been received but no 'adaptive state' command has been received thereafter.

As long as there is a valid 'active state' command from the control component 470 at the beginning of a new VoIP session, the DTX controller 440 keeps up an active state for the DTX transmission by taking care that packets are transmitted at the rate provided for speech frames (step 502). This can be realized for example in the same manner as described for step 303 of FIG. 3.

As soon as there is no valid 'active state' command from the control component 470 anymore, the DTX controller 440 causes a generation of frames based on the true state of the incoming audio frames (step 503) using the general operation.

Also this embodiment ensures that the network analyzer 133 of the electronic device 130 has sufficient information available at the beginning of a session to compute a reliable set of parameters describing the current reception characteristics.

Figure 6:
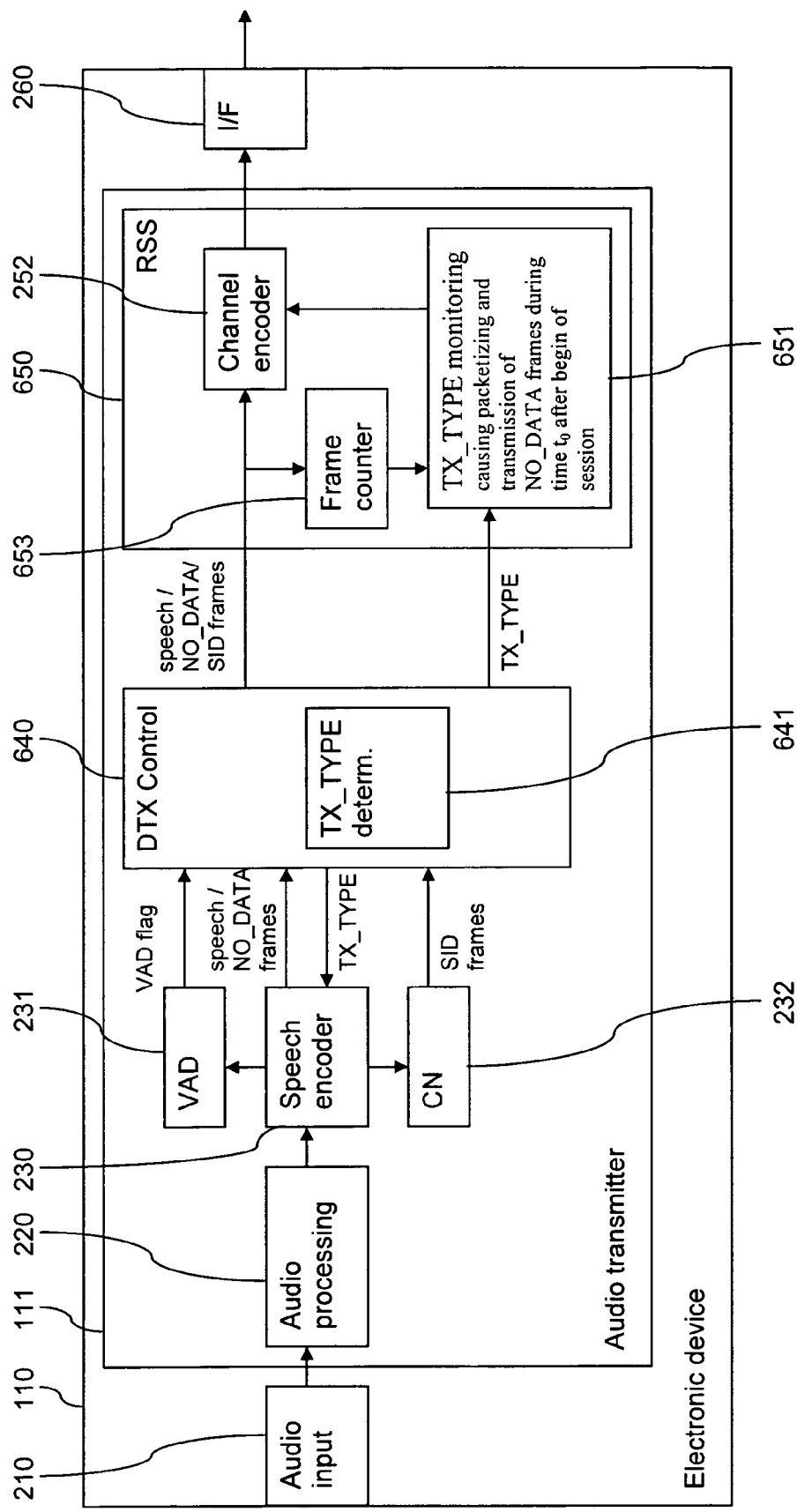
FIG. 6 illustrates details of a third exemplary device for the transmitting end in the system of FIG. 1.

FIG. 6 is a block diagram presenting details of a third exemplary implementation of the invention in electronic device 110.

Again, the presented structure is largely the same as in FIG. 2. Corresponding components have been provided with the same reference signs as in FIG. 2 and these components will not be described again.

In this case, however, the DTX controller 640 comprises a conventional TX_TYPE determination portion 641. Instead, the RSS 650 comprises a TX_TYPE monitoring portion 651, which is configured to cause a special proceeding during the beginning of a respective VoIP session. To this end, the RSS 650 is provided in addition with a counter 653 counting incoming frames.

Figure 7:
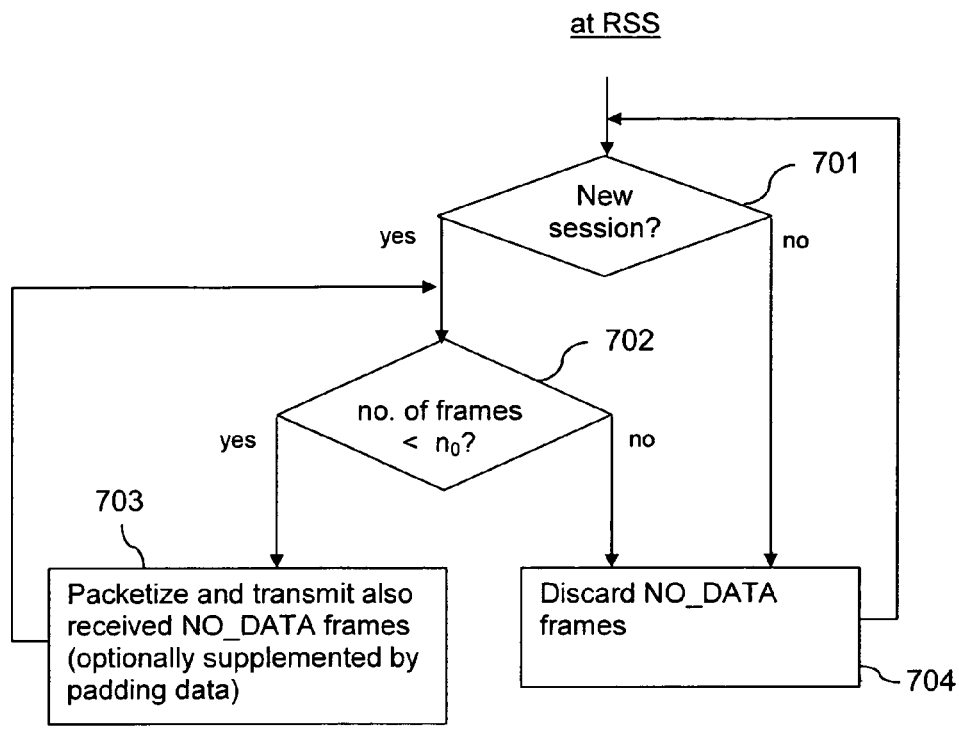
FIG. 7 is a flow chart illustrating an operation in the device of FIG. 6.

An operation in the electronic device 110 of FIG. 6 will now be described with reference to FIG. 7. FIG. 7 is a flow chart illustrating the operation in the RSS 650.

The general operation is again the same as described above for the electronic device of FIG. 2.

The RSS 650 thus receives frames and an indication of the transmission type for each frame from the DTX controller 240, the transmission type depending on the presence of active speech in the frames.

When the TX_TYPE monitoring portion 651 detects the beginning of a new session (step 701), however, it activates in this case the counter 653.

While the number of counted frames lies below a predetermined threshold $n_o$ (step 702), the TX_TYPE monitoring portion 651 causes the channel encoder 252 to encode and packetize all received frames, including those frames, for which a transmission type TX_TYPE=NO_DATA is indicated (step 703). Optionally, the packets that are based on frames, for which a transmission type TX_TYPE=NO_DATA is indicated, may be supplemented with padding data, in order to approach their size to packets that are based on speech frames.

Once the number of counted frames exceeds the predetermined threshold $n_o$ (step 702), the TX_TYPE monitoring portion 651 causes the channel encoder 252 to encode and packetize only those frames, for which a transmission type TX_TYPE=SPEECH GOOD, SID_FIRST or SID_UPDATE is indicated (step 704). The TX_TYPE monitoring portion 651 causes the channel encoder 252 to discard those frames, for which a transmission type TX_TYPE=NO_DATA is indicated.

Consequently, also this operation ensures that the network analyzer 133 of the electronic device 130 will have sufficient information available at the beginning of a session to compute a reliable set of parameters describing the current reception characteristics.

It is to be understood that instead of a counter 653, a timer could be used as well, just as in the embodiments of FIGS. 2 and 4.

The functional blocks of the audio transmitter 111 of electronic device 110 presented in FIGS. 2, 4 and 6 could be implemented in hardware, for instance as circuitry on a chip or chipset. The entire transmitter 111 could be realized for example as an integrated circuit (IC). Alternatively, the functions could also be implemented partly or entirely by a computer program code.

Figure 8:
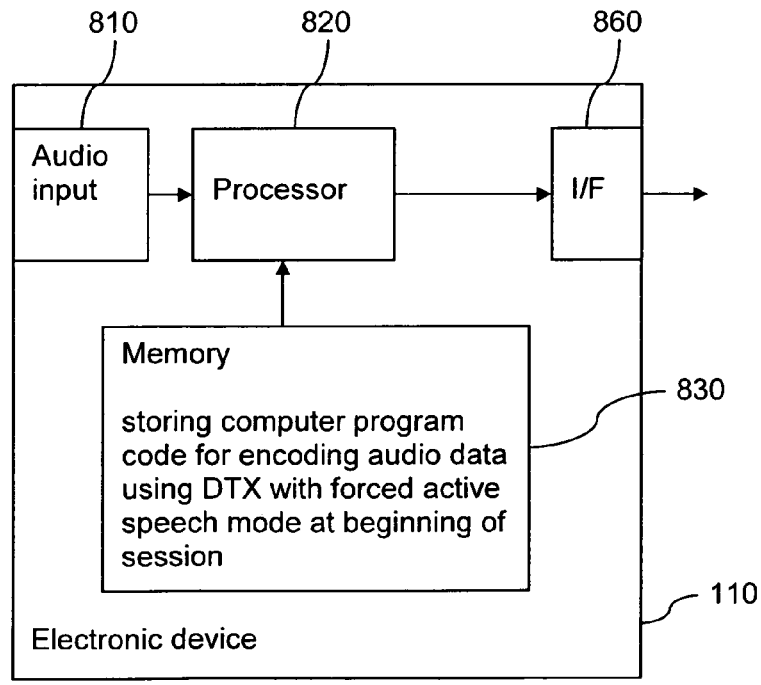
FIG. 8 illustrates details of a fourth exemplary device for the transmitting end in the system of FIG. 1.

FIG. 8 is a block diagram presenting details of a further exemplary implementation of the invention in electronic device 110, in which the functions are implemented by a computer program code.

The electronic device 110 may comprise in this case an audio input 810, for example a microphone, which is connected via a processor 820 to an interface (I/F) 860, the interface 860 enabling an access to the packet switched communication network 120.

The processor 820 is configured to execute available computer program code.

The electronic device 110 further comprises a memory 830 storing computer program code. The stored code comprises computer program code designed for encoding audio data using DTX with a forced active state at the beginning of a respective session.

The processor 820 may retrieve this code from the memory 830, when a VoIP session has been established, and execute the code for realizing for example one of the operations described with reference to FIGS. 3, 5 and 7.

It is to be understood that the same processor 820 could execute in addition computer program codes realizing other functions of the electronic device 110.

It is further to be understood that the exemplary architectures of the electronic devices 110, 130 presented in FIGS. 1, 2, 4, 6 and 8 are only intended to illustrate the basic logical functionality of a DTX transmission according to the invention. In a practical implementation, the represented functions can be allocated differently to processing blocks.

While described embodiments of the invention can be considered as medications of the AMR codec or the AMR-WB codec, it is to be understood that the invention can be employed with various other speech codecs as well.

The functions illustrated by the RSS 250 of FIG. 2 or 4, respectively, can also be viewed as means for providing packets for a discontinuous transmission of a speech signal via a packet switched network in shorter transmission intervals during an active state and in longer transmission intervals during an inactive state, the active state being selected whenever a speech signal comprises a speech burst, optionally with a hangover period after a respective speech burst. The functions illustrated by the DTX control 240 or 440 of FIGS. 2 and 4, respectively, can also be viewed as means for enforcing an active state in addition for a predetermined period at a beginning of a transmission session, irrespective of a presence of speech bursts, a length of the predetermined period exceeding a length of the hangover periods in case hangover periods are used.

Alternatively, the functions illustrated by the channel encoder 252 of FIG. 6 could be viewed as the first indicated means, while the functions illustrated by the TX_TYPE monitoring portion 651 of FIG. 6 could be viewed as the second indicated means. Further alternatively, the functions illustrated by the computer program code stored in memory 830 of FIG. 8 could be viewed as both the first and the second indicated means.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
   providing packets for a discontinuous transmission of a speech signal via a packet switched network in shorter transmission intervals during an active state and in longer transmission intervals during an inactive state, said active state being selected whenever a speech signal comprises a speech burst, optionally with a hangover period after a respective speech burst; and enforcing an active state in addition for a predetermined period at a beginning of a transmission session, irrespective of a presence of speech bursts, a length of said predetermined period exceeding a length of said hangover periods in case hangover periods are used.

2. The method according to claim 1, wherein said speech signal is divided into frames, and wherein during said enforced active state all frames of said speech signal are caused to be encoded like frames comprising active speech and to be packetized for transmission in packets.

3. The method according to claim 1, wherein enforcing said active state is achieved by selecting a corresponding transmission type in the scope of a discontinuous transmission control.

4. The method according to claim 3, wherein said predetermined period is monitored in the scope of said discontinuous transmission control.

5. The method according to claim 3, wherein said discontinuous transmission control is provided with an external command to enforce said active state.

6. The method according to claim 1, wherein said speech signal is encoded, said encoding resulting in frames that are indicated to contain usable data or not to contain usable data, wherein frames indicated not to contain usable data are packetized for transmission in packets during an enforced active state, while frames indicated not to contain usable data are discarded outside of an enforced active state.

7. The method according to claim 6, wherein packets based on frames that are indicated not to contain usable data are filled with padding data to approach their size to the size of packets based on frames that are indicated to contain usable data.

8. The method according to claim 1, wherein said predetermined period has a duration between 0.5 seconds and 5 seconds.

9. An apparatus comprising:

a processing component configured to provide packets for a discontinuous transmission of a speech signal via a packet switched network in shorter transmission intervals during an active state and in longer transmission intervals during an inactive state, said active state being selected whenever a speech signal comprises a speech burst, optionally with a hangover period after a respective speech burst; and a control component configured to enforce an active state in addition for a predetermined period at a beginning of a transmission session, irrespective of a presence of speech bursts, a length of said predetermined period exceeding a length of said hangover periods in case hangover periods are used.

10. The apparatus according to claim 9, wherein said speech signal is divided into frames, wherein said processing component comprises a speech encoder, which is configured to encode during said enforced active state all frames of said speech signal like frames comprising active speech, and to provide said encoded frames to be packetized for transmission in packets.

11. The apparatus according to claim 9, wherein said control component comprises a discontinuous transmission controller, which is configured to enforce said active state by selecting a corresponding transmission type.

12. The apparatus according to claim 11, wherein said discontinuous transmission controller is further configured to detect a beginning of a transmission and to monitor said predetermined period.

13. The apparatus according to claim 11, wherein said discontinuous transmission controller is further configured to receive an external command to enforce said active state.

14. The apparatus according to claim 9, further comprising an encoder configured to encode said speech signal, said encoding resulting in frames that are indicated to contain usable data or not to contain usable data, wherein said processing component is configured to packetize encoded frames received from said encoder for transmission in packets, wherein said control component is configured to cause said processing component to packetize frames indicated not to contain usable data during said enforced active state, and wherein said control component is configured to cause said processing component to discard frames indicated not to contain usable data outside of said enforced active state.

15. The apparatus according to claim 14, wherein said processing component is configured to fill packets based on frames that are indicated not to contain usable data with padding data to approach their size to the size of packets based on frames that are indicated to contain usable data.

16. The apparatus according to claim 9, wherein said predetermined period has a duration between 0.5 seconds and 5 seconds.

17. An electronic device comprising:
an apparatus according to claim 9; and
a user interface.

18. A system comprising:
an apparatus according to claim 9; and
an apparatus comprising a processing component configured to process packets received in a discontinuous transmission via a packet switched network using an adaptive jitter buffer.

19. A computer readable medium in which a program code is stored, said program code realizing the following when executed by a processor:

providing packets for a discontinuous transmission of a speech signal via a packet switched network in shorter transmission intervals during an active state and in longer transmission intervals during an inactive state, said active state being selected whenever a speech signal comprises a speech burst, optionally with a hangover period after a respective speech burst; and enforcing an active state in addition for a predetermined period at a beginning of a transmission session, irrespective of a presence of speech bursts, a length of said predetermined period exceeding a length of said hangover periods in case hangover periods are used.

20. The computer readable medium according to claim 19, wherein said speech signal is divided into frames, said computer program code causing all frames of said speech signal during said enforced active state to be encoded like frames comprising active speech and to be packetized for transmission in packets.

21. The computer readable medium according to claim 19, wherein said computer program code enforces said active state by selecting a corresponding transmission type in the scope of a discontinuous transmission control.

22. The computer readable medium according to claim 21, wherein said computer program code monitors said predetermined period in the scope of said discontinuous transmission control.

23. The computer readable medium according to claim 21, wherein said computer program code realizes a discontinuous transmission control, which is provided with an external command to enforce said active state.

24. The computer readable medium according to claim 19, wherein said speech signal is encoded, said encoding resulting in frames that are indicated to contain usable data or not to contain usable data, wherein frames indicated not to contain usable data are packetized for transmission in packets during an enforced active state, while frames indicated not to contain usable data are discarded outside of an enforced active state.

25. The computer readable medium according to claim 24, wherein packets based on frames that are indicated not to contain usable data are filled with padding data to approach their size to the size of packets based on frames that are indicated to contain usable data.

26. The computer readable medium according to claim 19, wherein said predetermined period has a duration between 0.5 seconds and 5 seconds.

27. An apparatus comprising:

means for providing packets for a discontinuous transmission of a speech signal via a packet switched network in shorter transmission intervals during an active state and in longer transmission intervals during an inactive state, said active state being selected whenever a speech signal comprises a speech burst, optionally with a hangover period after a respective speech burst; and means for enforcing an active state in addition for a predetermined period at a beginning of a transmission session, irrespective of a presence of speech bursts, a length of said predetermined period exceeding a length of said hangover periods in case hangover periods are used.

* * * * *